Feb. 22, 1966     J. KIRSCH ETAL     3,236,512
SELF-ADJUSTING HYDROPNEUMATIC KINETIC ENERGY
ABSORPTION ARRANGEMENT
Filed Jan. 16, 1964
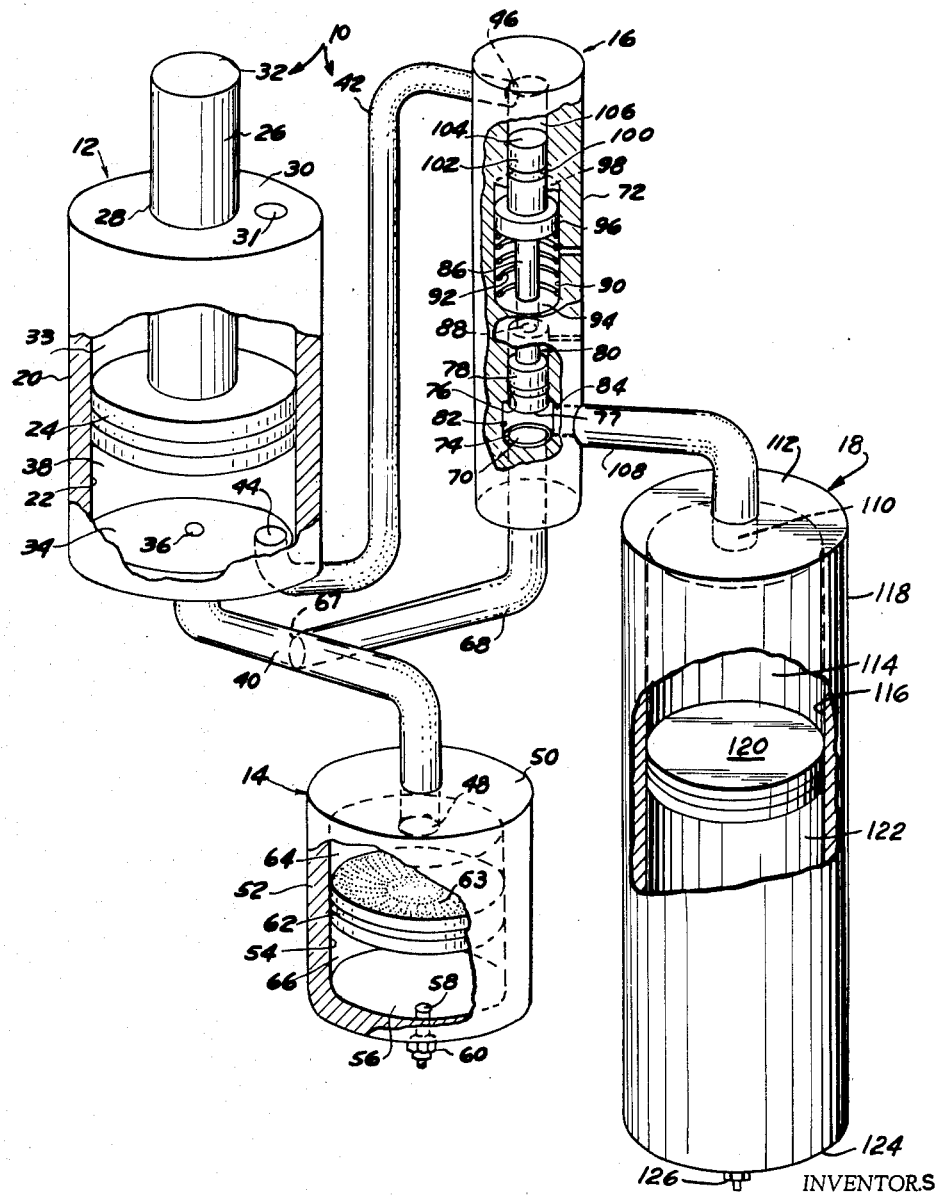
INVENTORS
JERRY KIRSCH
CASLAV V. STANOJEVIC
BY   *Barthel & Bugbee*
ATTORNEYS

United States Patent Office 3,236,512
Patented Feb. 22, 1966

3,236,512
SELF-ADJUSTING HYDROPNEUMATIC KINETIC
ENERGY ABSORPTION ARRANGEMENT
Jerry Kirsch, 3946 Bishop Road, and Caslav V. Stanojevic, 16809 Baylis St., both of Detroit, Mich.
Filed Jan. 16, 1964, Ser. No. 338,234
14 Claims. (Cl. 267—1)

This invention relates to cushioning arrangements and, in particular, to hydropneumatic cushioning and kinetic energy absorption arrangements involving the cooperative action of hydraulic and pneumatic fluid performing the energy absorption producing cushioning.

One object of this invention is to provide a self-adjusting hydropneumatic cushioning and kinetic energy absorption arrangement which absorbs impact energy impressed upon a load, such as a cargo load, and prevents the shock either of impact or of recoil from becoming excessive so as to damage the load, and which is self-adjusting to the magnitude of the impact so as to absorb the impact energy either in one cycle of operation or in a succession of such cycles by a self-adjusting action which automatically controls the deceleration of the load upon impact and the acceleration thereof upon recoil.

Another object is to provide a self-adjusting hydropneumatic cushioning or kinetic energy absorption arrangement which absorbs impact energy in two stages which cooperate with one another to release hydraulic fluid from a first stage hydraulic cylinder into a second stage high-pressure low-volume hydropneumatic accumulator and thence through a self-adjusting interphase or control valve into a low-pressure high-volume hydropneumatic storage accumulator so that the impact energy is absorbed with a controlled deceleration of the load gradually and more evenly than in cushioning arrangements hitherto available.

Another object is to provide a self-adjusting hydropneumatic cushioning or kinetic energy absorption arrangement of the foregoing character wherein the hydraulic fluid transmitted from the first stage cylinder to the second stage accumulator is forced to pass through a restricted orifice so as to exert back pressure upon a part of the hydraulic fluid which passes through a sensing conduit to the interphase valve to momentarily close the valve so as to temporarily prevent discharge of hydraulic fluid from the second stage or high-pressure accumulator through the valve into the low-pressure accumulator, but which, upon the approximate balancing of the pressures on opposite sides of the orifice, causes opening of the valve to permit high-pressure hydraulic fluid to be discharged from the second stage high-pressure accumulator into the low-pressure accumulator.

Another object is to provide a self-adjusting hydropneumatic cushioning or kinetic energy absorption arrangement which upon absorption of the impact energy in the foregoing manner operates reversely to return the hydraulic fluid gradually from the low-pressure accumulator to the first stage hydraulic cylinder so as to return the piston thereof to its original position and restore the load, which had shifted during impact, to its original position with a controlled acceleration in a gradual manner without substantial shocks.

Another object is to provide a self-adjusting hydropneumatic cushioning or kinetic energy absorption arrangement which will operate automatically alternately to discharge high-pressure hydraulic fluid from the high-pressure second stage accumulator into the low-pressure accumulator and recharges the high-pressure second stage accumulator while automatically closing the interphase valve in a sequence of cycles accompanied by reciprocation of the interphase valve so that the impact energy is gradually and controlledly absorbed whereby damage to the load is prevented by preventing the development of excessive unabsorbed shock resulting from excessive rapid deceleration or acceleration of the load.

Other objects and advantages of the invention will become apparent during the course of the following description of the accompanying drawing, wherein is shown diagrammatically in perspective a self-adjusting hydropneumatic cushioning arrangement according to one form of the invention.

Referring to the drawing in detail, the figure shows a self-adjusting hydropneumatic cushioning or impact energy absorption arrangement, generally designated 10, according to one form of the invention as consisting generally of a first-stage energy absorption unit 12, a high-pressure low-volume second stage hydropneumatic accumulator 14, an automatically self-adjusting interphase or control valve 16, and a low pressure high volume hydropneumatic storage accumulator 18 all interconnected in the manner described below to cooperatively and gradually absorb the impressed impact energy of a shifting load without permitting the accumulation at any one time of an excessive energy sufficient to damage the load.

In particular, the first stage energy absorption unit 12 consists of a hydraulic cylinder 20 in the bore 22 of which a piston 24 is reciprocably mounted and connected to a piston rod 26 which projects through a bore 28 exteriorly of the forward cylinder head 30 and has an outer end 32 upon which the impact of the shifting load is impressed and subjected to controlled deceleration. The forward cylinder head 30 is provided with an air vent 31 to release air from the upper chamber 33 of the cylinder bore 22 above the piston 24. The rearward cylinder head 34 of the cylinder 20 is provided with a restricted outlet orifice 36, the small cross-sectional area of which retards the discharge of hydraulic fluid therethrough from the lower hydraulic fluid chamber 38 in the lower end of the cylinder bore 22 below the piston 24 into a main discharge conduit 40 so as to develop a back pressure which is transmitted to fluid backing up in a sensing conduit 42 leading from the cylinder port 44 to the end port 46 of the interphase or control valve 16.

The main discharge conduit 40 at its rearward end is connected to and discharges hydraulic fluid through a port 48 in the forward cylinder head 50 of a high-pressure low-volume hydropneumatic accumulator cylinder 52 having a cylinder bore 54 closed at its opposite ends by a rearward cylinder head 56 containing a charging port 58 to which a gas charging valve 60 is connected. A free or floating piston 62 with a concave top 63 to prevent closing off of the port 48 is reciprocably mounted in the cylinder bore 54 and divides the cylinder 52 into a forward hydraulic fluid chamber 64 and a rearward high pressure gas chamber 66. From a port 67 in the main hydraulic conduit 40 a branch hydraulic conduit 68 runs to a port 70 with a bevelled annular valve seat 74 in the lower end of a valve bore 76 in the elongated valve body 72 of the interphase or control valve 16. Mounted in the valve bore 76 is the valve spool 78 of an elongated reciprocable valve plunger 80 with its lower end 77 projecting into an enlargement 82 thereof forming a valve chamber.

Opening out of the valve chamber 82 is a discharge port 84. The valve spool 78 is mounted on the lower end of a valve rod 86 which passes through an intermediate bore 88 in the valve body 72 into an enlarged counterbore or spring chamber 90 containing a compression spring 92 and having lower and upper end walls 94 and 98. The compression spring 92 engages and urges upward toward the end wall 98 an annular enlargement 96 on the valve member 80. The counterbore 90 opens into an upper end bore 100 in which is mounted the upper head 102 on the upper end of the valve member 80. The upper head 102 has an upper end 104 which is equal in area to the lower end 77 and which is disposed in an upper end chamber 106 which is formed by the upper end of the bore 100 and which receives hydraulic fluid through the port 46 from the interphase or sensing conduit 42.

Connected to the side port 84 of the lower end chamber 82 is a hydraulic fluid conduit 108, the lower end of which is connected to a port 110 through the upper cylinder head 112 opening into the upper hydraulic fluid chamber 114 at the upper end of a cylinder bore 116 in the cylinder 118 of the low pressure hydropneumatic accumulator 18. Reciprocably mounted in the cylinder bore 116 is a floating or free piston 120 below which is a low-pressure high-volume gas chamber 122. The cylinder 118 is closed at its lower end by a lower cylinder head 124 containing a gas charging valve 126.

In the operation of the invention, let it be assumed that the operator has filled with hydraulic fluid, such as hydraulic oil, the chamber 34 below the piston 24 of the first stage energy absorption unit 12, its connected conduits 40, 42 and 68 and end chambers 82 and 106 of the interphase valve 16 and the upper chamber 64 of the second stage accumulator 14. Let it also be assumed that the chamber 66 of the second stage hydropneumatic accumulator 14 has been charged with gas at high pressure through the charging valve 60, for example, a charge of nitrogen gas at 600 pounds per square inch. At this time, the spring 92 of the interphase valve 16 is holding the valve spool 78 of the valve plunger 80 in its uppermost position opening the port 70 and allowing oil to pass through the conduit 108 into the upper chamber 114 of the low pressure hydropneumatic storage accumulator 18 above the piston 120. In order to eliminate the adverse effect of air above the floating piston 120, it will, however, be assumed that the conduit 108 and upper chamber 114 of the storage accumulator 18 have been filled with hydraulic fluid, such as oil. Let it finally be assumed that the gas chamber 122 of the storage accumulator 18 has been charged with a low pressure gas through a charging valve 126, for example, nitrogen gas at a pressure of ten pounds per square inch.

If, now, the end 32 of the piston rod 26 of the first stage energy absorption unit 12 is subjected to an impact force and consequently has a large amount of kinetic energy suddenly applied thereto, this impressed force and energy drives the piston rod 26 and piston 24 downward, exerting a compression force upon the oil in the chamber 38, causing it to be expelled at a retarded rate of flow through the restricted orifice 36 into the conduit 40 and thence into the chamber 64 of the second stage high-pressure hydropneumatic accumulator 14, forcing the piston 62 downward and further compressing the high-pressure gas in the lower chamber 66 thereof.

Meanwhile, the restricted orifice 36 has caused a differential pressure to be set up on opposite sides thereof since the restriction caused by the small size of the orifice 36 has retarded the flow of hydraulic fluid therethrough while not retarding the flow of hydraulic fluid through the port 44 and interphase sensing conduit 42. The higher pressure developed in the hydraulic fluid above the restricted orifice 36 is transmitted through the port 44, conduit 42 and port 46 into the upper chamber 106 of the interphase control valve 16, where it acts upon the upper surface 104 of the upper valve member head 102 to force the latter downward so as to compress the spring 92 and seat the valve head 78 of the valve plunger 80 on the seat 74 in the lower chamber 82. This action closes the port 70 and thus halts the flow of hydraulic fluid from the branch line 68 through ports 70 and 84, conduit 108 and port 110 into the upper chamber 114 of the low-pressure high-volume storage accumulator 18.

With the interphase valve 16 thus shifted into its closed position, hydraulic fluid forced through the restricted orifice 36 from the lower hydraulic fluid chamber 38 in response to impact pressure upon the piston rod 26 of the first stage cylinder 12 can only travel through the main discharge conduit 40 and port 48 into the upper hydraulic chamber 64 of the high-pressure low-volume second stage accumulator 14 above the concave upper surface 63 of the free piston 62. As a result, this pressure urges the free piston 62 downward, further compressing the gas in the lower gas chamber 66 in the second stage accumulator 14. Further displacement of hydraulic pressure fluid from the lower chamber 38 of the first stage accumulator 12 into the upper chamber 64 of the second stage accumulator 14 causes further descent of the free piston 62, further increasing the gas pressure in the lower chamber 66 thereof sufficiently to balance the hydraulic pressures across the restricted orifice 36.

When such a balance of hydraulic pressures occurs between the first and second stage accumulators 12 and 14 on opposite sides of the restricted orifice 36, a consequent balance of pressures occurs on the opposite end surfaces 77 and 104 of the valve member 80 of the interphase control valve 16, whereupon the previously compressed spring 92 moves the valve plunger 80 upward so that its lower valve head 78 moves off the valve seat 74. The high pressure gas in the lower chamber 66 of the second stage accumulator 14 then expands and moves the free piston 62 upward, forcing hydraulic pressure fluid to flow from the conduit 68 through the chamber 82 and conduit 108 into the upper chamber 114 of the low-pressure high-volume accumulator 18.

This action urges the free piston 120 of the low-pressure high-volume accumulator 18 downward, further compressing the low-pressure gas in its lower chamber 122. Meanwhile, the upward travel of the free piston 62 in the second stage accumulator 14 made possible by the discharge of hydraulic pressure fluid from its upper chamber 64 may be said to "reset" the second stage accumulator 14 for the reception of the next high-pressure hydraulic fluid received from the first stage accumulator 12 in response to the next impact upon the piston rod 26. If, at this time, the energy of the impact previously applied has been fully absorbed, the valve plunger 80 of the interphase control valve 16 remains in its raised or open position, held by the compression spring 92 in the position shown in the drawing, and a balanced pressure exists on opposite sides of the restricted orifice 36 of the first stage accumulator 12. With the disappearance of impact pressure upon the piston rod 26, the further compressed low-pressure gas in the lower chamber 122 of the low-pressure high-volume storage accumulator 18 pushes its free piston 120 upward so as to displace hydraulic fluid from its upper chamber 114 through its port 110 and conduit 18 into lower valve chamber 82 of the interphase control valve 16, whence it flows through conduits 68 and 40 and restricted orifice 36 into the lower hydraulic chamber 38 of the first stage accumulator 12, thereby moving its piston 24 and piston rod 26 upward, the air in the upper chamber 33 escaping through the vent 31. This action replenishes the hydraulic fluid in the lower chamber 38 of the first stage accumulator 12 and resets the accumulator 12 by repositioning the piston 24 and piston rod 26 in their upper positions so as to prepare its outer end 32 and condition the system 10 for the reception of another impact.

In this manner, the action of the low-pressure high-volume storage accumulator 18 has replenished the hydraulic fluid dumped from the first and second stage accumulators 12 and 14 during impact and returned the first stage piston 24 to its previously occupied position before impact at a restrained and retarded safe rate of acceleration, thereby eliminating the recoil damage which has so frequently occurred in prior impact-cushioning systems.

If, on the other hand, the impact energy has not been fully absorbed during the above-described first cycle of operation, the cycle of operation repeats itself in one or more such cycles of operation until all of the impact energy has been absorbed. After each such dumping of hydraulic fluid from the second stage accumulator chamber 64 through the interphase control valve 16 into the low-pressure high-volume storage accumulator 18 has caused repositioning of the pistons 24 and 26 of the first and second stage accumulators 12 and 14, the remaining impact energy acting upon the piston rod 26 repeats this dumping of hydraulic fluid into the storage accumulator 18, then causes more hydraulic fluid to be forced by the piston 24 through the restricted orifice 36 through the conduit 14 into the upper chamber 64 of the second stage accumulator 14, recompressing the gas in its lower chamber 66 and reestablishing a pressure differential on opposite sides of the restricted orifice 36. In the manner previously described, the higher pressure in the chamber 38 acting through the conduit 42 upon the upper end surface 104 of the valve plunger 80 again forces the latter downward so as to compress the spring 92 and close the valve head 78 upon the valve seat 74 at the port 70. As a result, the free piston 62 is again forced downward to further compress the high-pressure gas in the lower chamber 66 of the second stage accumulator 14, again cushioning the existing impact force upon the piston rod 26 of the first stage accumulator 12. Thus, if the entire impact force and energy are not absorbed by the initial closing and subsequent opening of the interphase control valve 16 and dumping of hydraulic fluid into the low-pressure high-volume storage accumulator 18, they are absorbed in successive steps by the repeated closing and opening of the interphase control valve 16 and the accompanying repeated downward and upward movements of the piston 62 of the high-pressure low-volume second stage accumulator 14.

It will be understood by those skilled in the hydraulics art that the size of the restricted orifice 36 and the precharge pressure and volume of the lower gas chamber 66 of the second stage accumulator 14 may be varied as desired, in order to vary the number of cycles of operation of the system 10 occurring per unit time.

It will be further understood that in an expendable apparatus such as in an emergency cushioning system at the bottom of an elevator shaft or in an emergency aerospace landing gear, re-use of the hydraulic working fluid is not required, the low-pressure high-volume hydropneumatic energy-storing accumulator 18 may be dispensed with and omitted, so that the hydraulic working fluid passing through the interphase control valve 16 is discharged directly into the atmosphere or outer space through the port 84 thereof. In summation, the system 10 transforms impact energy caused by linear motion into an oscillatory dissipation of that energy, resulting in a controlled cushioning of the impact which effectively prevents damage to the apparatus and cargo controlled.

What we claim is:

1. A self-adjusting hydropneumatic kinetic energy absorption arrangement, comprising a first hydraulic cylinder including a first hydraulic chamber with a restricted outlet orifice and a relatively unrestricted outlet port, and a first piston therein having a driving portion extending exteriorly thereof;

a high-pressure low-volume hydropneumatic energy accumulator including a second hydraulic cylinder and a second piston therein dividing said second cylinder into a second hydraulic chamber hydraulically connected to said orifice and a first pneumatic chamber containing a relatively high pressure gas;

a low-pressure high-volume hydropneumatic energy storage accumulator having a third hydraulic cylinder and a third piston therein dividing said third cylinder into a third hydraulic chamber and a second pneumatic chamber containing a gas at a relatively low pressure, and automatic control valve means selectively interconnecting said second and third hydraulic chambers and including a hydraulic valve-operating device hydraulically connected to said outlet port, said control valve means being temporarily responsive to back pressure through said outlet port resulting from retardation of hydraulic fluid flow out of said orifice upon impression of kinetic energy on said driving portion to normally close communication between said second and third hydraulic chambers but subsequently responsive to rise of pressure beyond said orifice to open communication therebetween and discharge hydraulic fluid from said second hydraulic chamber into said third hydraulic chamber.

2. A self-adjusting hydropneumatic kinetic energy absorption arrangement, according to claim 1, wherein said valve means includes a valve casing and a valve member movably mounted therein to selectively open and close said communication.

3. A self-adjusting hydropneumatic kinetic energy absorption arrangement, according to claim 2, wherein said valve casing includes an operating chamber connected to said outlet port and said valve member includes an operating piston portion disposed within said operating chamber.

4. A self-adjusting hydropneumatic kinetic energy absorption arrangement, according to claim 3, wherein said valve means also includes a resilient element operatively connected to said valve member and normally urging said valve member away from its communication-closing position.

5. A self-adjusting hydropneumatic kinetic energy absorption arrangement, according to claim 2, wherein said valve casing also includes a hydraulic valve chamber having an inlet port connected to said orifice and an outlet port connected to said third hydraulic chamber and wherein said valve member has a valving portion selectively opening and closing communication between said inlet and outlet ports.

6. A self-adjusting hydropneumatic kinetic energy absorption arrangement, according to claim 5 wherein said valve member within said valve chamber has an opposition piston portion disposed in counteracting relationship to said operating piston portion.

7. A self-adjusting hydropneumatic kinetic energy absorption arrangement, according to claim 2, wherein said valve member is reciprocably mounted in said valve casing.

8. A self-adjusting hydropneumatic kinetic energy absorption arrangement, according to claim 3, wherein said valve member is reciprocably mounted in said valve casing.

9. A self-adjusting hydropneumatic kinetic energy absorption arrangement, according to claim 4, wherein said valve member is reciprocably mounted in said valve casing.

10. A self-adjusting hydropneumatic kinetic energy absorption arrangement, according to claim 5, wherein said valve member is reciprocably mounted in said valve casing to move said valving portion between its port opening and closing positions.

11. A self-adjusting hydropneumatic kinetic energy absorption arrangement, according to claim 5, wherein said valve member within said valve chamber has an opposition piston portion disposed in counter acting relationship to said operating piston portion, and wherein said valve member is reciprocably mounted in said valve casing.

12. A self-adjusting hydropneumatic kinetic energy absorption arrangement, according to claim 1, wherein said second piston is a free piston.

13. A self-adjusting hydropneumatic kinetic energy absorption arrangement, according to claim 1, wherein said third piston is a free piston.

14. A self-adjusting hydropneumatic kinetic energy absorption arrangement, according to claim 1, wherein both said second piston and said third piston are free pistons.

References Cited by the Examiner

UNITED STATES PATENTS

| | | |
|---|---|---|
| 2,031,000 | 2/1936 | Mercier. |
| 3,077,345 | 2/1963 | Anderson et al. _____ 267—64 |
| 3,170,575 | 2/1965 | Gibson _____ 267—64 X |

FOREIGN PATENTS

| | | |
|---|---|---|
| 834,809 | 5/1960 | Great Britain. |
| 872,885 | 7/1961 | Great Britain. |

ARTHUR L. LA POINT, *Primary Examiner.*